United States Patent

Eggert et al.

[15] 3,694,908

[45] Oct. 3, 1972

[54] METHOD OF PRODUCING A SELENIUM RECTIFIER

[72] Inventors: Heinz Eggert, Berlin 33, Germany; Ekkehard Schillmann, Tongi-Dacca, Pakistan

[73] Assignee: Siemens Aktiengesellschaft, Berlin and Munich, Germany

[22] Filed: April 15, 1970

[21] Appl. No.: 31,126

[30] Foreign Application Priority Data

April 25, 1969 Germany..........P 19 22 140.0

[52] U.S. Cl. ........................29/590, 29/576, 148/185

[51] Int. Cl. ............................B01j 17/00, H011 7/24

[58] Field of Search..29/589, 590; 148/185; 317/241

[56] References Cited

UNITED STATES PATENTS

| | | | |
|---|---|---|---|
| 2,745,047 | 5/1956 | Lighty | 317/241 |
| 3,484,657 | 12/1969 | Madorian et al. | 317/235 |

*Primary Examiner*—John F. Campbell
*Assistant Examiner*—W. Tupman
*Attorney*—Curt M. Avery, Arthur E. Wilfond, Herbert L. Lerner and Daniel J. Tick

[57] ABSTRACT

In a method for producing a selenium rectifier, a thin base selenium layer is first placed upon a metallic carrier electrode. This base selenium layer is converted into a metal selenide layer by means of a heat treatment, at a temperature above 250° C., through reaction with the metal of the carrier electrode, to from a barrier-free junction. Thereafter, the unconverted remaining selenium layer is coated with the main layer of the selenium semiconductor body and the entire semiconductor body is thermally converted or formed into the best conducting modification. The selenium, used for the selenium layer, is so doped with a halogen and another particularly metallic element, that the conductivity of the remaining selenium layer, following the thermal forming of the entire semiconductor body, is from 5 to 50 times the conductivity of the main selenium layer.

6 Claims, 1 Drawing Figure

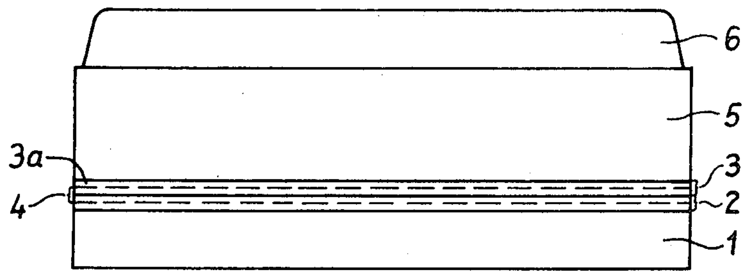
6
5
3a
3
4
2
1

METHOD OF PRODUCING A SELENIUM RECTIFIER

In the production of selenium rectifiers, it is necessary to obtain the best possible barrier free junction between the metallic carrier electrode and the selenium layer. To this end, it is customary to provide the surface of the carrier electrode with a selenide layer, prior to the application of the actual selenium layer. For this purpose, the carrier electrode is provided with a thin selenium layer which is applied in powder form, e.g., by vapor deposition or by brushing on the selenium. The carrier electrode is then heated to 250° C. or above, whereby the reaction of the selenium with the metal of the carrier electrode forms a metal selenide layer. It is important that a portion of the thin selenium layer is maintained thereby in elemental form. Nickel selenide layers were found to be particularly advantageous. To produce such a layer, a nickel plated iron or aluminum sheet, for example, is used for the carrier electrode. The junction thus obtained between the carrier electrode and selenium layer is barrier free in the sense that the voltage drop of the junction is at most about 0.1 V, in forward direction, with reference current.

It is known that the conductivity of the selenium can be considerably increased by adding halogens, particularly chlorine. An additional increase of conductivity can be obtained through the use of particularly metallic doping materials, whose amount is in a specific ratio to the amount of halogens (German Pat. No. 1,156,897). For the main selenium layer of selenium rectifiers, extremely high doping with halogens and metals which would considerably reduce the forward resistance cannot be used since the blocking capacity of the actual barrier layer positioned between the selenium layer and the counter-electrode would suffer. For selenium which is used for forming the selenide layer on the carrier electrode, a metal halogen doping was previously not considered. It is known, however, to use halogen containing selenium for this purpose.

The invention relates to a method for producing a selenium rectifier, where a thin basic selenium layer is first placed on a metallic carrier electrode. This layer is converted partly into a metal selenide layer through heat processing at 250° C., in order to produce a barrier free junction. Thereafter, the nonconverted remaining selenium layer is coated with the main layer of the selenium semiconductor body and the entire semiconductor body is converted through a thermal forming, into the best possible conducting modification. This is done by using a selenium for the basic selenium layer, which is so doped with a halogen and another, particularly metallic element that the conductivity of the remaining selenium layer, following the thermal formation of the entire semiconductor body, is 5 to 50 times the conductivity of the main selenium layer.

Firstly, the invention provides that the forward resistance of the total rectifier is reduced due to the high conductivity of the remaining selenium layer. The blocking ability of the rectifier is not impaired thereby since the highly doped remnant selenium layer is separated from the actual blocking layer, through the much thicker main layer. Moreover, the high conductivity of the remaining selenium layer also improves the barrier free junction between the carrier electrode and the selenium layer, i.e., the voltage drop is considerably lower when the rectifier is stressed in forward direction. Also, the highly doped remaining selenium layer acts, during the operation of the rectifier, as a depot wherefrom dopants gradually migrate into the main layer of the selenium, thereby compensating a forward change (in the sense of a resistance increase in the main layer).

The invention will be described with reference to the drawing and will explain the known production method of a selenium rectifier as far as it is important for the invention.

An iron sheet 1 is used, for example, as a carrier electrode. The carrier electrode is nickel plated with a nickel layer 2. The nickel layer 2 is coated with a thin selenium layer 3, for example, through vapor deposition or by being brushed on, in powder form. The carrier electrode, coated with the selenium layer 3, is heated in a furnace to, for example 300° C., whereby the selenium layer 3 is molten down and reacts with the nickel of layer 2 to form nickel selenide. The resulting nickel selenide layer is denoted as 4, its boundaries are shown in broken lines. A portion 3a of the original selenium layer 3 remains in elemental form above the nickel selenium layer 4.

The much thicker main selenium layer 5 can now be placed upon the selenium layer **3*a*, preferably by vapor-deposition. It is of advantage to crystallize the remaining selenium layer 3*a* through heat processing, at a temperature a little below the selenium melting point, for example, 218°° C. The main selenium layer 5 is now provided with the counter electrode 6, which is generally a tin cadmium alloy. The entire rectifier is subsequently thermally formed, at a temperature slightly below the selenium melting point, for example, at 218° C., whereby the selenium of layer 5** also converts into the best conducting hexagonal modification.

Following the melting, the thickness of the selenium layer 3 may be about 5$\mu$, while the thickness of the remaining selenium layer **3*A*, after the formation of the nickel selenium layer 4, may be about 2$\mu$. The main selenium layer 5** is, usually 30 to 70$\mu$ thickness.

According to the invention, the selenium used is highly doped with halogen and another additive, particularly metal. Thus, according to the above described thermal forming of the rectifier, the conductivity of the remnant selenium layer **3*a*, amounts to 5 to 50 times the conductivity of the main selenium layer 5**. Suitable halogens are chlorine, bromine and iodine, which are preferably added to the original selenium in form of the respective selenium halides. Suitable metals for increasing the conductivity are primarily antimony, bismouth, tin, tellurium, thallium, indium, gallium and iron. Arsenic or sulphur should be considered as other, non-metallic dopants. German Pat. No. 1,156,897 teaches that to obtain a high conductivity of the selenium, specific volume ratios should be maintained between halogen and selenium, on one hand and the metallic supplement and the halogen addition, on the other hand. The halogen addition should therefore be in an atomic ratio to the selenium about 10 to 80 $\cdot$ $\mathbf{10^{-5}}$, the metal addition in an atomic ratio to the halogen addition is about 0.01 to 0.9, preferably 0.05 to 0.3. It was shown however, that for the metal addition, the most favorable range of the atomic ratio to the halogen addition can be somewhat expanded upward and can be 0.05 to 0.50.

The following are examples of the doping systems for the selenium, used for the selenium layer 3:

The main selenium layer 5 should be coated with 150 ppm chlorine (150 weight parts chloride to 1 million weight parts selenium). According to the thermal forming of the total rectifier, the layer 5 will then have a conductivity of about $5 \cdot 10^{-3}\ \Omega^{-1}cm^{-1}$.

For the indicated doping of the main selenium layer 5, a doping of 400 ppm chloride and 175 ppm iron can be selected for the selenium of the thin basic selenium layer 3. In this instant, the remnant selenium layer 3*a* will have a conductivity of $50 \cdot 10^{-3}\Omega^{-1}\ cm^{-1}$, following the thermal forming of the entire rectifier. Thus, its conductivity is to 10 times that of the main selenium layer 5.

In its place, a doping of 200 ppm chloride and 35 ppm gallium can be selected for the selenium of the thin basic selenium layer 3. This results in a conductivity of $90 \cdot 10^{-3}\Omega^{-1}cm^{-1}$ for the thermally formed selenium layer 3*A*.

An additional increase in conductivity can be obtained through a larger gallium addition, e.g., 106 ppm gallium next to 200 ppm chlorine. The conductivity of the thermally formed remnant selenium layer 3*a* is approximately $200 \cdot 10^{-3}\Omega^{-1}cm^{-1}$.

The listed chloride or iron and gallium additions may be varied within the above-named scope. Thus, the addition of chlorine in the selenium of the original selenium layer 3 may be within a range of 100 and 500 ppm. The iron or gallium addition should be selected in an atomic ratio of 0.05 to 0.50 relative to the respective chlorine content. Thus, for the indicated lower limit of the chlorine content of 100 ppm, one obtains an iron content of 8 to 80 ppm or a gallium content of 10 to 100 ppm; at the upper limit of the chlorine content of 500 ppm, the iron content is in the amount of 40 and 400 ppm or the gallium content is between 50 and 500 ppm.

The chlorine content of the main selenium layer 5 can be varied between 30 and 200 ppm. The conductivity of this layer, following its thermal forming, is about 2 to $6 \cdot 10^{-3}\ \Omega^{-1}\ cm^{-1}$. The selenium of the main layer 5 can be doped aside from chlorine, also with a metal whereby care must be taken that the conductivity of this layer should always remain lower than that of the remnant selenium layer 3*a*. For example, in addition to a chlorine content of 100 ppm, a tellurium addition of 5 to 30 ppm, could be provided. The conductivity of this selenium layer, amounts to about $10 \cdot 10^{-3}\ \Omega^{-1}\ cm^{-1}$ at a tellurium content of 25 ppm, following the thermal forming.

When iron or gallium are used as doping metals, it is preferable to apply the layer 3 by powdering, on the already doped selenium upon the carrier electrode 1, 2, since these metals vaporize with difficulty. Other easier to vaporize metals such as e.g., tellurium, can with the halogen and metal doped selenium be vapor deposited, with the aid of a uniform vaporizer.

We claim:

1. The method of producing a selenium rectifier, which comprises first placing a thin basic selenium layer upon a metal carrier electrode, partially converting said selenium layer into a metal selenide layer, by means of heat processing, at from 250° to 300° C. through reaction with the metal to form a barrier free junction, thereafter depositing the main layer of the selenium semiconductor body upon non-converted remnant selenium layer, and converting the entire semiconductor body into the best conducting modification by heating at a temperature slightly below the melting point of selenium, using for the basic selenium layer selenium so doped with a halogen and with another element, that the conductivity of the remnant selenium layer following the thermal forming of the entire semiconductor body is 5 to 50 times the conductivity of the main selenium layer.

2. The process of claim 1, wherein said another element is metallic.

3. The process of claim 2, wherein selenium doped with 150 ppm chlorine is used for the main body and selenium doped with 100 to 500 ppm chlorine and an iron addition in an atomic ratio of 0.05 to 0.50 to chlorine is used as the basic selenium layer.

4. The process of claim 2, wherein selenium doped with 150 ppm chlorine is used for the main body and selenium doped with 100 to 500 ppm chlorine and a gallium addition in an atomic ratio of 0.05 to 0.50 to chlorine is used as the basic selenium layer.

5. The process 3, claim 3 wherein the doped selenium of the basic selenium layer is deposited in powder form on the carrier electrode.

6. The process of claim 4, wherein the doped selenium of the basic selenium layer is deposited in powder form on the carrier electrode.

* * * * *